Aug. 30, 1960     J. O. BLIXRUD ET AL     2,950,668
AUTOMATIC TOASTER

Filed Dec. 16, 1954     8 Sheets-Sheet 1

Fig 1

INVENTORS
JOHN O. BLIXRUD
JEROME C. JOHNSON
EDMOND G. FRANKLIN
By Stuart R. Peterson
ATTORNEY Aug. 30, 1960   J. O. BLIXRUD ET AL   2,950,668
AUTOMATIC TOASTER Filed Dec. 16, 1954   8 Sheets-Sheet 7

Fig 7

INVENTORS
JOHN O. BLIXRUD
JEROME C. JOHNSON
EDMOND G. FRANKLIN

By Stuart R. Peterson
ATTORNEY

Aug. 30, 1960   J. O. BLIXRUD ET AL   2,950,668
AUTOMATIC TOASTER

Filed Dec. 16, 1954   8 Sheets—Sheet 8

INVENTORS
JOHN O. BLIXRUD
JEROME C. JOHNSON
EDMOND G. FRANKLIN

By   *Stuart R. Peterson*
ATTORNEY

United States Patent Office 2,950,668
Patented Aug. 30, 1960

2,950,668

AUTOMATIC TOASTER

John O. Blixrud, New Brighton, Jerome C. Johnson, St. Paul, and Edmond G. Franklin, Minneapolis, Minn., assignors to General Mills, Inc., a corporation of Delaware Filed Dec. 16, 1954, Ser. No. 475,792

17 Claims. (Cl. 99—329)

This invention relates to toasters and pertains more particularly to a fully automatic toaster of the household variety.

One object of the invention is to provide a fully automatic toaster which is operated through its complete cycle without the user having to bother with the manipulation of levers, push buttons and the like, the slice of bread itself acting to initiate the toasting operation.

Another object of the invention is to provide an automatic toaster in which no re-cycling will occur until the toast has actually been removed and a new slice of bread inserted in its stead.

A further object is to provide a toaster of the automatic variety in which the bread is automatically lowered to toasting operation and thereafter raised to non-toasting position after the toasting operation has been completed, the invention envisaging the employment of a thermal motor that is energized only during a preliminary interval in which the main heating elements are de-energized. Stated otherwise, it is contemplated that the main heating elements and the thermal motor be interlocked with each other so that neither is energized simultaneously with the other, thereby minimizing the over-all electrical load requirements of the toaster.

Further, another object resides in the ease with which the color of the toast may be adjusted for different degrees of darkness.

Still another object of the invention resides in the facility of fabrication and the ease of assembly of the parts constituting the subject matter of the present invention.

Also, it is an aim of the invention to provide a toaster that is rugged and long lasting, requiring little attention from the user with regard to maintenance.

Another object of the invention is to minimize the number of toaster parts, the invention having in view the dual utilization of the bimetal as the thermal motor and also as the spring in which the energy for subsequently raising the toast carriage is stored during the lowering of the untoasted bread.

Yet another important object resides in the employment of an ambient temperature compensating device which permits the carriage to rise sooner after the toaster has become heated. Stated somewhat differently, the invention proposes a device by which the toasting period is shortened for the toasting of successive slices of bread, owing to the fact that there is a certain amount of residual heat remaining from the preceding toasting operation.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

Referring in detail to the drawings, attention is first directed to Figs. 1–8 where an embodiment of the invention bearing the reference character "A" is pictured. As will be apparent from an inspection of these particular views, the embodiment "A" comprises a casing 10 having a pair of bread slots 12 and 14, the casing enclosing a toaster frame indicated generally by the numeral 15. These bread slots 12 and 14 provide entrances to toasting compartments wherein are situated a plurality of heating elements 16. Mounted for vertical reciprocation between the heating elements 16 is a carriage 18 having a bread rack disposed under each of the bread slots 12 and 14. Guiding the carriage 18 in its vertical reciprocal path is a number of vertical slots 20 in the frame 15, there being projections or protuberances 21 on the carriage which extend through these slots to maintain the desired rectilinear movement of the carriage.

Although the particular linkage by which the carriage 18 is lowered and raised is of conventional construction, nonetheless particular reference will be made thereto inasmuch as this type of linkage lends itself very readily to the use of a bimetallic member which supplies the actuating force in a manner presently to be described. Therefore the parallel motion linkage has been designated in its entirety by the reference numeral 22 (Figs. 2 and 6) and it will be seen that this linkage includes an upper arm 24, a lower arm 26, an upstanding bracket 28 secured in a rigid fashion to the carriage 18, and additional brackets 29 and 30 secured in a rigid manner to the toaster frame 15, these arms and brackets being pivotally interconnected in an articulated manner by reason of pivot pins 32. From Fig. 2 it will be observed that the lower arm 26 has an extension 34 formed with an upwardly facing notch 36.

Figure 2:
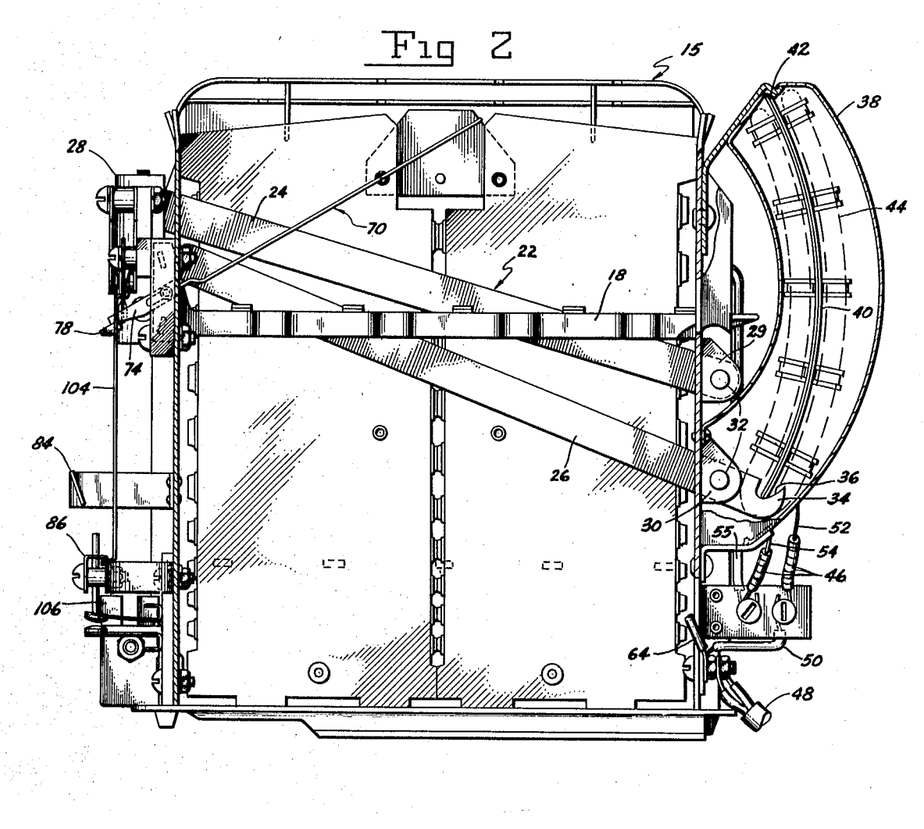
Fig. 2 is a side elevational view corresponding to the operational position of Fig. 1.
Figure 3:
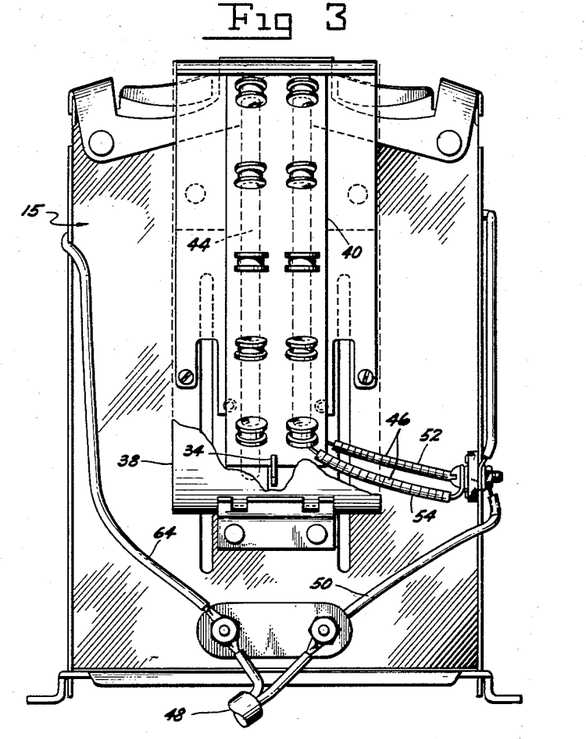
Fig. 3 is an end elevational view of the toaster, the end being opposite to that visible in Fig. 1.

The extension 34 is disposed for vertical angular movement in an auxiliary housing 38 at one end of the toaster. Also within the housing 38 is a bimetallic member 40 having its upper end 42 in abutting relation with a fixed portion of said housing 38. The lower end of the bimetallic member 40, however, rests in the notch 36, and as seen in Fig. 2, the bimetallic member 40 is somewhat arcuate when viewed from one side inasmuch as it has been placed so as to be held tightly by the housing 38 and the arm 26. As will be better understood hereinafter, the bimetallic member 40 acts to raise the carriage 18 after a toasting operation has been performed and in this connection it will be understood that a relatively high degree of inherent resiliency should be incorporated into the construction of the bimetallic member. With this in mind it is thought advisable to present the precise arrangement that has been found satisfactory in actual tests. Accordingly, it might be pointed out that a Saflex bimetallic member, manufactured by the H. A. Wilson Company, was employed in one working model, this bimetallic member having a length of 4¼ inches, a width of 1¼ inches, and a thickness of 0.020 inch. One nicety about the Saflex bimetal is that it remains relatively inactive up to about 300° F., actually possessing negative deflection characteristics up to this particular temperature. Above 300° F., particularly in the range of 500 to 800° F., it operates with a positive deflection and is useful when heated to supply the motivating force for the carriage 18. It will be appreciated that if the carriage is to return completely to its original position after the conclusion of a toasting cycle, then the use of a bimetallic member that operates substantially above the ambient temperature of the toaster is to be preferred. Accordingly it will be appreciated that the above alluded to bimetallic element possesses these desirable characteristics and therefore its use is recommended although other bimetallic members would be satisfactory.

In order to furnish adequate heat to the bimetallic member 40, there is provided an auxiliary heating element 44 which is secured in close proximity to the bimetallic member by means of ceramic insulating bushings 46 which are in turn affixed in a suitable manner to the metallic surface of the bimetallic member 40. In order to supply electrical power to the auxiliary heating element 44, a supply cord 48 having a plug 49 (Fig. 8) is made available for connection to a conventional household electrical outlet. As can be seen from Fig. 2, there is a relatively short conductor 50 and another longer conductor 52 leading to one side of the heating element 44. From the other side of the heating element there extends a conductor 54 having connection with a further conductor 55, which latter conductor leads to a pair of resilient contact arms 56 and 58 equipped with cooperable contacts 60 and 62.

For a purpose soon to be made manifest the contact arms are provided with a certain amount of inherent resiliency which creates a rather slight spacing between the contacts 60 and 62. The conductor 55 attaches to the contact arm 56 and the other arm 58 has secured thereto a conductor 64 leading back to the other side of the supply cord 48. As brought out immediately above, the contacts 60 and 62 are biased slightly toward each other and the reason for this lies in the fact that there is associated with these contacts another contact arm 66 bearing a contact 68 for the purpose of bridging the contacts 60 and 62 when the contact arm 66 is pivoted upwardly or in a clockwise direction about a pin 67 on the toaster frame 15 as viewed in Fig. 1.

For the purpose of pivoting the contact arm 66 in the above described manner there is employed a switch actuating lever 70 which, by its travel, is responsible for causing the energization of the auxiliary heating element 44. This switch actuating lever 70 has a looped wire end portion 72 and a relatively flat end portion 74 of sheet material, this flat portion having formed therein a longitudinal slot 76 and a follower head 78 carried at its distal end. Inasmuch as it is desired that the lever 70 be moved up and down with the carriage 18 one of the projections 21 supports a pin 82 which also extends through the slot 76 so that the lever 70 is mounted for sliding and pivotal movement, all for a purpose which will be hereinafter explained more fully. Another element, the purpose for which will soon become clear, is a cam 84 in the form of a strip having one end thereof affixed to the frame 15, this cam having an inclined surface lying in the downward path of the follower head 78 so that the lever 70 will be moved from the position depicted in Fig. 1 to a more inwardly disposed position such as that appearing in Fig. 7. In this connection it should be explained that the end of the lever 70 having the follower head 78 is heavier than the looped wire end 72 so that normally when no bread has been inserted into the toaster, the lever will assume the inclined position illustrated in Figs. 1 and 2.

Passing now to a description of the way in which the main heating elements 16 are energized, a switch actuating lever 86 is employed for this specific purpose, the lever 86 being pivotally connected with the frame 15 of the toaster at 88 and having a stud element 90 at its free end. The stud element 90 is directed downwardly and is engageable with an upper resilient switch arm 92, there also being a lower switch arm 94 subjacent the switch arm 92. The switch arms 92 and 94 are provided with cooperable contacts 96 and 98. In circuit with the contacts 96 and 98 is a conductor 100 which has electrical connection with the previously mentioned conductor 64. Another conductor 102 leads from the lower switch arm 94 to one of the heating elements 16 and while not visible in the drawings, other than the schematic view of Fig. 8, the opposite side of the heating elements 16 is connected back to the supply cord 48. In this way it will be appreciated that the main heating elements 16 are in parallel relationship with the auxiliary heating element 44. However, to avoid simultaneous energization of the heating elements 16 and 44, a wire link element 104 connects between the pivotal switch arm 66 and the lever 86, the interlocking action being occasioned in a manner better reserved for discussion during the operational portion of the description.

Inasmuch as it is intended that the bimetallic member 40 also serve as the means by which the carriage is returned to its upper or non-toasting position and also due to the fact that it is contemplated that this bimetallic member will act as the timing means for controlling the length of the toasting operation, there is furnished a means for restraining the tendency for the bimetallic member 40 to straighten immediately, thereby permitting the obtaining of a desired predetermined timing action, since the release of the bimetallic member can be accomplished at an optimum moment. The exemplified construction bearing the letter "A" utilizes a permanent magnet 106 which is fixedly mounted with regard to the toaster. The bracket 28, besides serving in the capacity of a connecting member, may also act as the armature for the permanent magnet 106 providing the bracket is of such flux permeable material as iron. In this way the armature or bracket 28 will encounter the permanent magnet and will be retained in its lower position until sufficient cooling action has transpired within the bimetallic member 40 to draw the bracket or armature 28 away from this magnet. For simplicity, the way in which the color of the toast may be varied in this version is not set forth, but those familiar with the art can appreciate that a magnetic shunt or other means may be employed in conjunction with the magnet whereby the magnetic attraction of the magnet may be lessened or increased. Consequently when a lighter piece of toast is desired, the action of the magnet may be weakened and the bimetallic member 40, upon cooling, will cause the armature or bracket 28 to break away sooner than it would if the magnetic attraction were of a greater magnitude. In order to render the operation of the toaster as silent as possible and where a long, dark toasting cycle is used to prevent complete ejection of the toasted slice, a dashpot assembly 108 is suggestively employed and since this dashpot 108 can be of conventional construction, the details of it need not be set forth with any degree of particularity.

Although the operation of the modification labelled "A" is believed readily apparent from a study of the preceding description, nonetheless a brief operational sequence will now be given. Accordingly, when the parts of the toaster are in the position depicted in Fig. 1, the toaster is ready for the reception of a slice of bread which is to be toasted. Actually a slice of bread may be placed in either or both of the bread slots 12 and 14 but inasmuch as a saving in manufacturing costs is desirable, only the bread slot 14 is equipped with a switch actuating lever 70, so if only one slice of bread is to be toasted, this particular slot must be selected. As can be seen from an inspection of the relative disposition of the various parts shown in Fig. 1, the switch contacts 60 and 62 are unbridged by the contact 68 and the contacts 96 and 98 are also separated. Thus it will be recognized that the toaster at this stage is in a preliminary or inactive non-toasting position.

Figure 4:
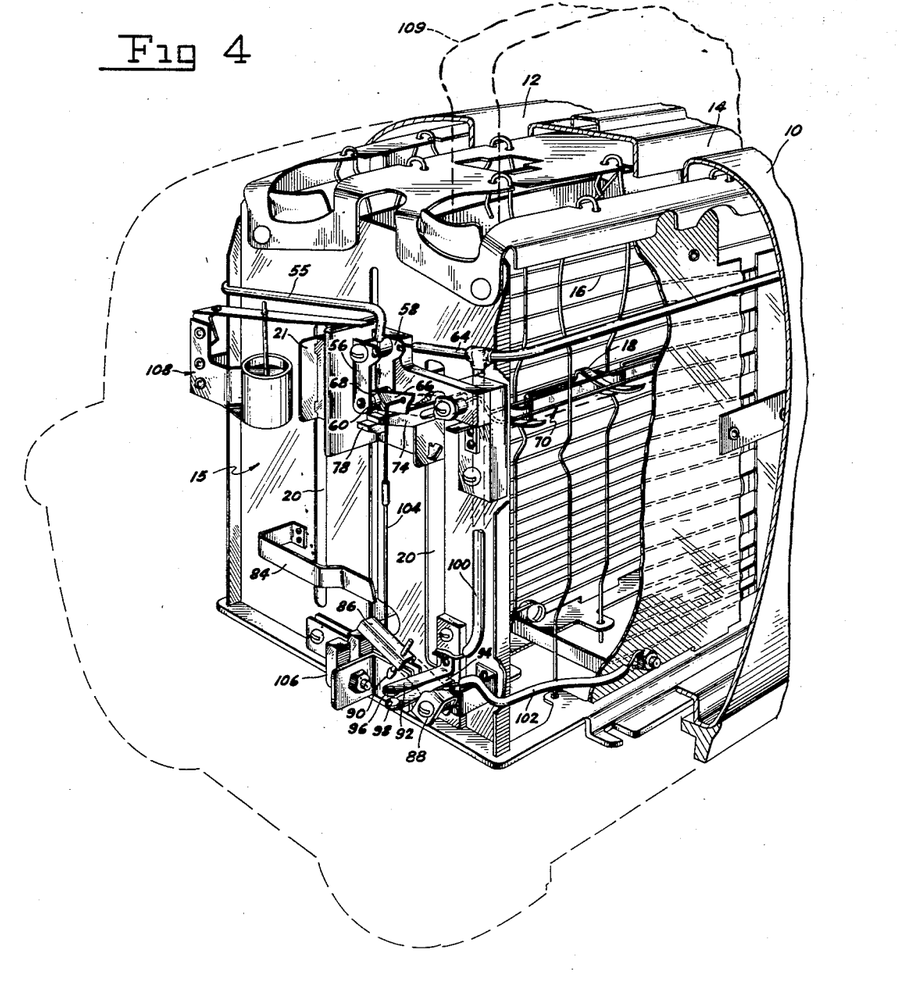
Fig. 4 is a view similar to Fig. 1 but showing a slice of bread immediately after it has been inserted into one of the toaster slots.
Figure 5:
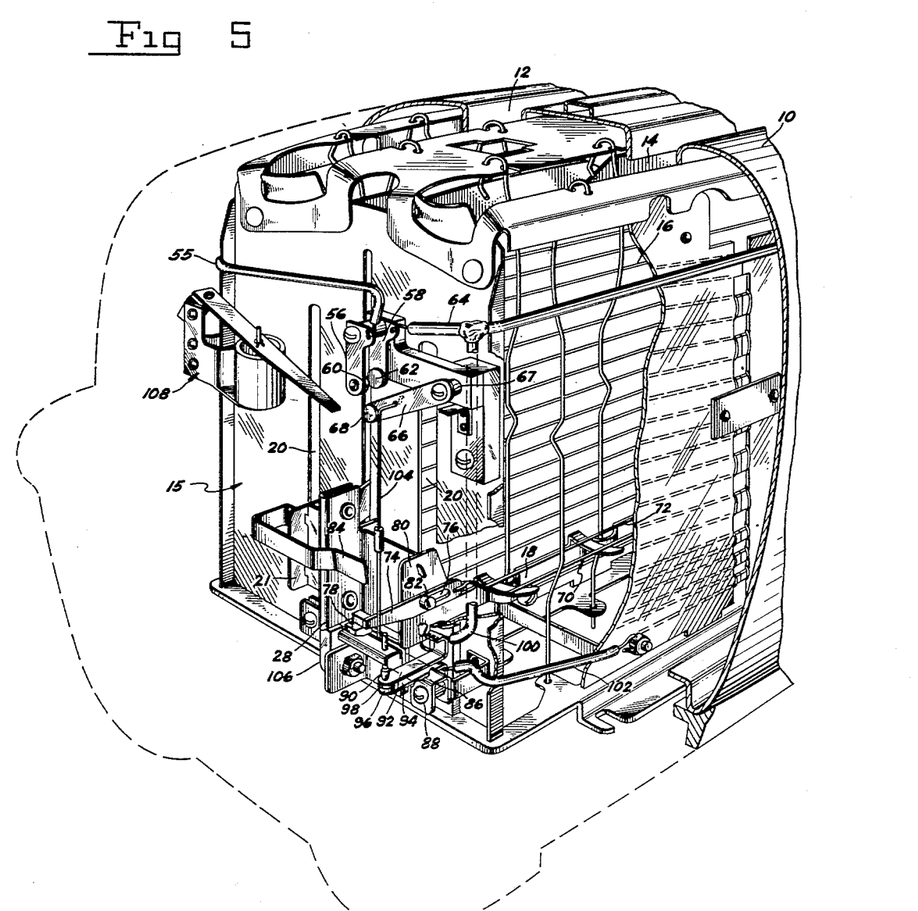
Fig. 5 is a perspective view showing the carriage after it has reached its toasting position.

However, when a slice of bread 109, such as that pictured in phantom outline in Fig. 4, is placed within the slot 14, the switch actuating lever is shifted about the pin 82 into a substantially horizontal position, this being due to the fact that the bread is much heavier than the end 74. This action causes the follower head 78 to be raised and in the course of being raised, the head abuts against the under side of the contact arm 66. Rotation of the contact arm 66 in a clockwise direction as viewed in Fig. 4 is instrumental in bringing the contact 68 into a position intermediate the contacts 60 and 62, overcoming what little bias exists between these contacts due to the inherent resiliency of their contact arms 56 and 58. The bias is sufficient, however, to retain frictionally the arm 66 in its raised position until forcibly moved through a reverse arc, explained later.

Figure 6:
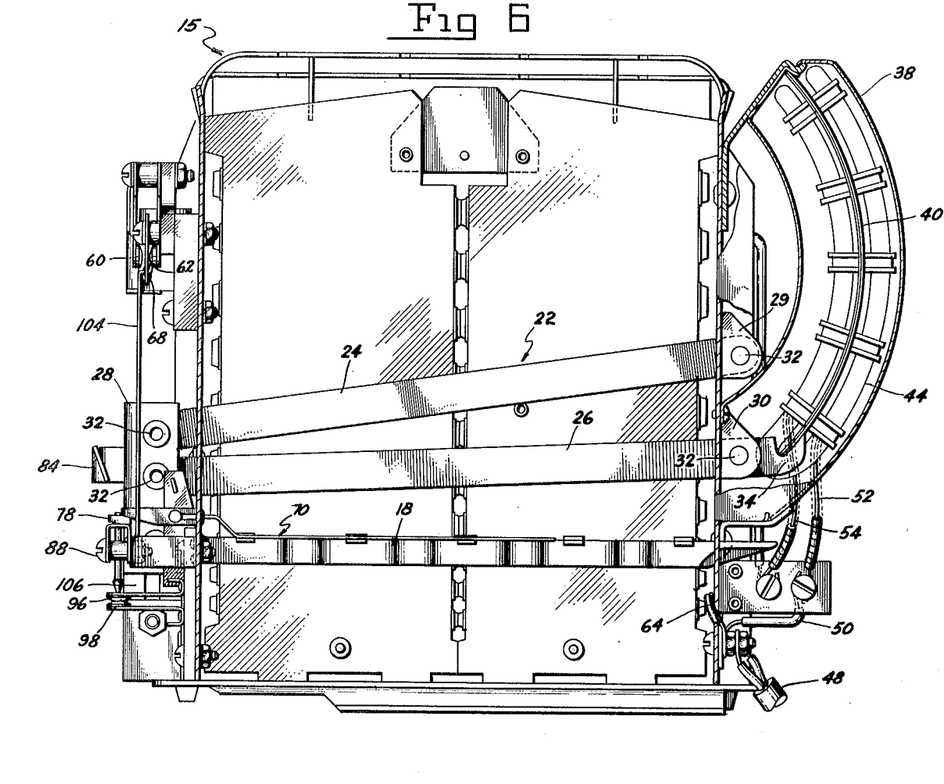
Fig. 6 is a side elevational view corresponding to Fig. 5.
Figure 7:
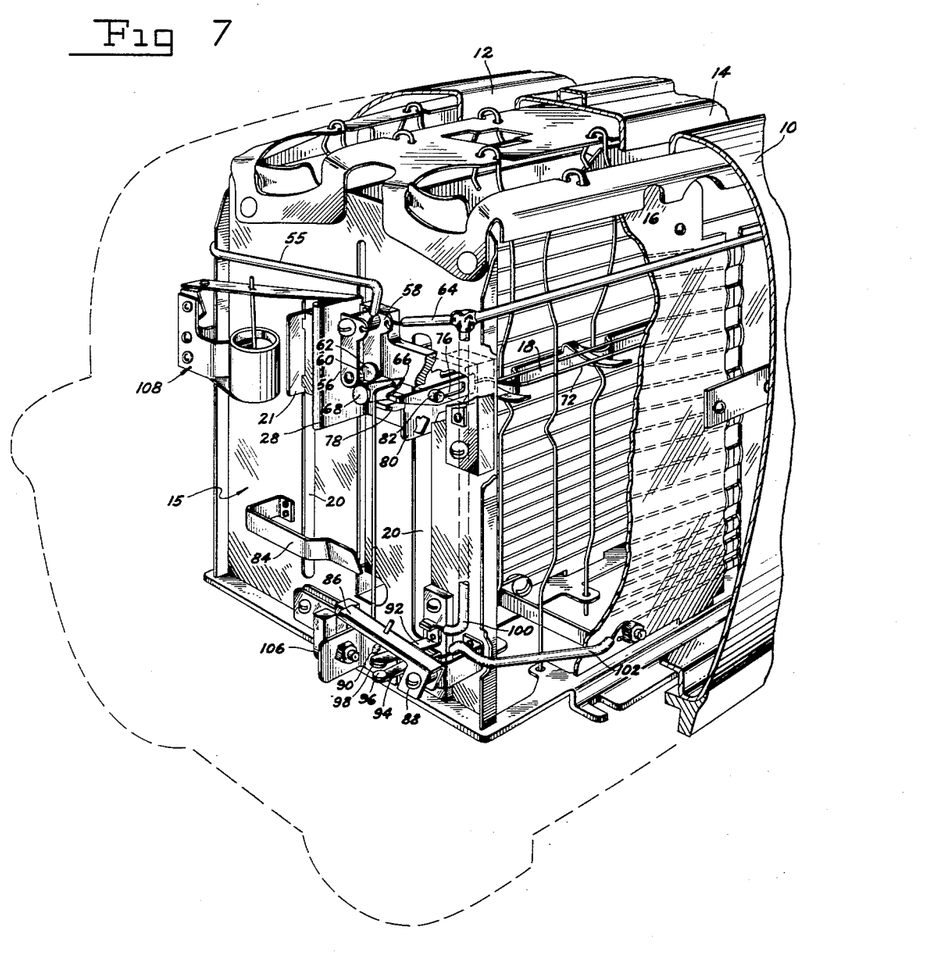
Fig. 7 is a perspective view similar to Fig. 1 but showing the carriage after it has again returned to its non-toasting position, the toasting operation now having been completed.
Figure 8:
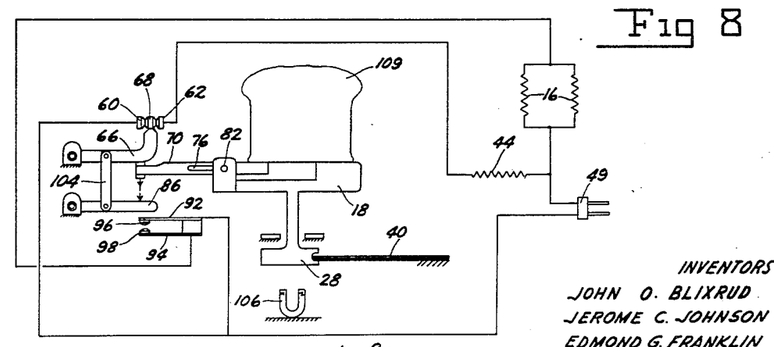
Fig. 8 is a schematic diagram illustrating the salient parts of the toaster pictured in Figs. 1–7.

Once having bridged the gap between the contacts 60 and 62, current is permitted to flow through the auxiliary heating element 44 and due to its adjacency with the bimetallic member 40, the bimetallic member begins to deflect, decreasing its radius of curvature until it approaches the arcuate position pictured in Fig. 6. While this is happening, however, the bimetallic member 40, being constrained by the notch 36 and the housing 38, allows the extension 34 of the lower arm 26 to rotate in a counterclockwise direction as viewed in Fig. 2. The permitting of rotation of the extension 34 is responsible for allowing the parallel motion linkage 22 to move and the carriage 18, due to its weight and that of the bread, lowers itself by gravity in the illustrated arrangement. The lowering action continues until the actuating lever 70 engages the switch actuating lever 86. It might be pointed out at this time, too, that during the course of its downward travel, the follower head 78 engages the cam 84 and the entire actuating lever 70 is moved inwardly with respect to the toaster, that is, from left to right as viewed in Figs. 3, 5, and 6. Since the contact arm 66 and the switch actuating lever 86 are interconnected by the link 104, the engagement of the switch actuating lever 70 with the switch actuating lever 86 immediately causes the contact arm 66 to be drawn downwardly so that the frictional engagement of the contacts 60 and 62 with the contact 68 is overcome, the circuit thus being broken inasmuch as the bridging contact 68 is no longer sandwiched between said contacts 60 and 62. This action causes the immediate deenergization of the auxiliary heating element 44 but since the lever 86 is designed to close the contacts 96 and 98 on the switch arms 92 and 94, it will be appreciated that the main heating elements 16 are in this way energized. Consequently the actual toasting operation is inaugurated and as long as the heating elements 16 remain energized the toasting operation will continue.

The toasting action, however, is subsequently interrupted, after an appropriate heating interval, inasmuch as the bimetallic member 40 continues to cool, this being by reason of the fact that the contacts 60 and 62 have been separated by the downward withdrawal of the contact 68. The permanent magnet 106, though, is responsible for restraining the tendency of the bimetallic member 40 to straighten out into its normal less arcuate configuration and it will be understood that the bimetallic member must flex back toward its normal position an appreciable amount before it has exerted sufficient force to break the bracket or armature 28 away from the magnet 106. At this point it will be emphasized that for the sake of simplicity, the means by which the magnetic attraction may be varied has not been shown. However, the degree of attraction the magnet has for the armature 28 will determine the action that must take place by the cooling of the bimetallic member 40.

When the armature or bracket 28 has been broken away from the magnet 106, then the carriage 18 is moved through a reverse path, that is, raised, and the raising of the carriage, since it carries therewith the lever 70, causes the contacts 96 and 98 to separate, thereby deenergizing the main heating elements 16. As the follower head 78 is moved upwardly with the carriage 18 into the position depicted in Fig. 7, it does not strike the under side of the contact arm 66 as it did when the slice of bread 109 was inserted into the slot 14, for the cam 84 has moved this lever 70 inwardly to such an extent that it will not abut against the contact arm 66 on its upward travel. As a matter of fact, it will not again abut the under side of the contact arm 66 until the slice of bread 109, now toasted, has been removed from the slot 14. In this respect, the removal of the toasted bread from the slot will permit the heavy end 74 of the switch actuating lever 70 to cause the lever to rotate into the position pictured in Fig. 1, thus raising the lighter or looped end 72.

Figure 1:
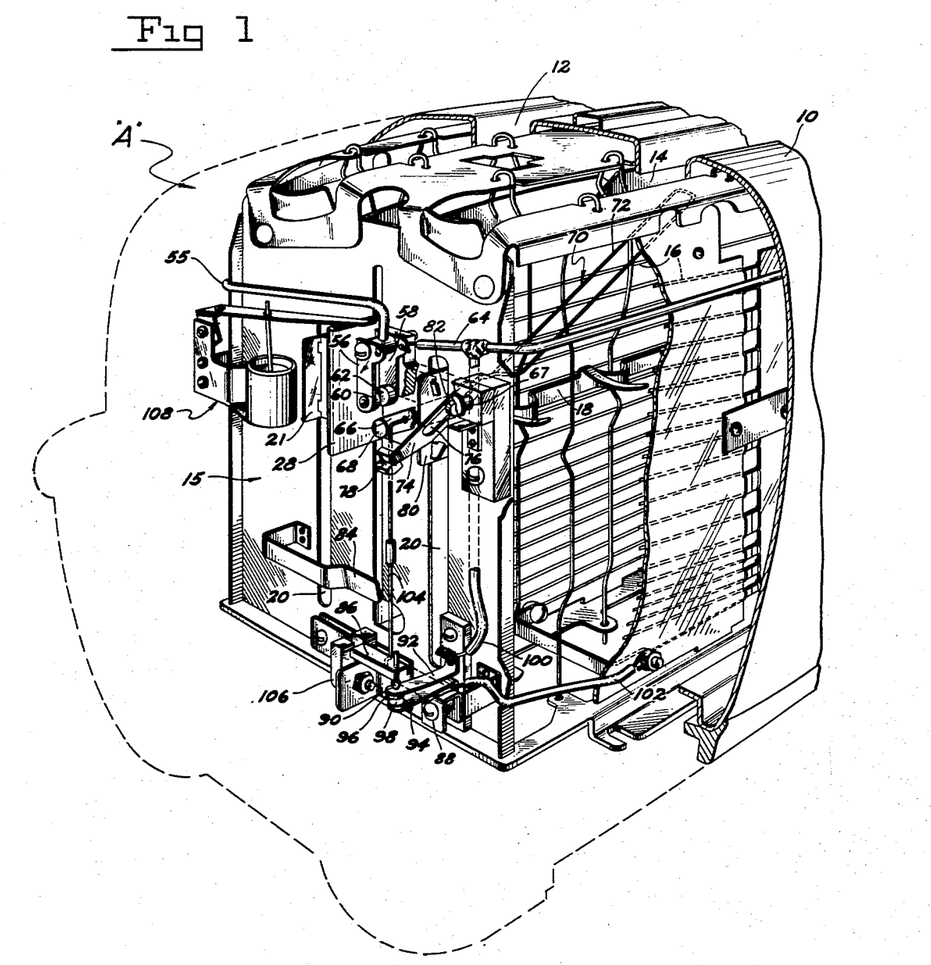
Figure 1 is a perspective view with the casing broken away to show the internal construction of the toaster, the particular position depicted being one before a slice of bread has been inserted into the toaster.

This action completes an entire cycle of the toaster for it will be discerned that the looped end 72, once having returned to the position illustrated in Fig. 1, is elevated so that when a second slice of bread is inserted into the slot 14, the heavier end 74, together with its follower head 78, will be raised and will abut the under side of the contact arm 66 so that the auxiliary heating element 44 will again be energized for this succeeding slice of bread and repetition of the toasting cycle.

In certain instances it is envisioned that the permanent magnet 106 will not always be the preferred means for latching or restraining the carriage 18 in its toasting position. Therefore it is within the purview of the invention to use a mechanical latching mechanism which will serve to hold the carriage down until its release is desired. Also, it is within the contemplation of the invention to utilize what might be best termed an ambient temperature compensation arrangement designated generally with the latching mechanism by the reference numeral 110. To this end, in the modification "B" of Figs. 9 and 10, there is employed an L-shaped bracket member 112 which carries a pivotal arm 114, there being an adjustable stud 116 mounted at the lower end of the arm 114 as by a threaded engagement with an aperture in said arm. One end of the stud 116 is in an abutting relationship with a piston 118 contained within a cylinder or cage 120, functionally best understood by reference to the cross sectional make-up of Fig. 10. Also within the cylinder 120 is disposed a coil spring 122 against one end of which the piston 118 bears and having its other end in engagement with a ball 124. The ball 124 in turn is engageable and disengageable with a pivotal dog element 126 which can be mounted on the lower end of the bracket 28. This pivotal dog element is designed to pivot in a clockwise direction as viewed in Fig. 10 but not in a counterclockwise direction as viewed in this particular figure. In this way, the action of the spring 122 is instrumental in determining when the ball 124 can be pressed inwardly by action of the dog element 126 to release the carriage 18 so that it will be moved upwardly into a non-toasting position by reason of the bimetallic member 40.

Cognizance is taken of the fact that the toaster, upon successive toasting operations, heats up and once having become hotter than it was during the beginning of the first toasting cycle, the residual heat is responsible for providing a quicker toasting action. Therefore it is an aim of the invention to provide a means for compensating for this increased toaster temperature, and with this in mind, the invention employs an auxiliary bimetallic member 128 which is riveted at 130 to the frame 15. The free end of the bimetallic member 128 exerts a force against an actuating rod 132 which is carried at the lower end of the arm 114. Hence when the toaster becomes warm or heated, the bimetallic member 128 begins to flex and is responsible for moving the arm 114 from its solid line position of Fig. 10 to the dotted line position of this figure, which movement, of course, causes the spring action within the cylinder 120 to be reduced and thereby permit disengagement of the dog element 126 from the ball 124 sooner than it would if the spring pressure had not been reduced. In this way, the carriage 18 is permitted to rise earlier and the concomitant opening of the contacts 96 and 98 results in a shortened heating period. It will be appreciated that the adjustable stud 116 provides a ready means by which the color of the toast may be controlled for the stud by virtue of its threaded relationship with the arm 114 may be moved either toward or away from the ball end of the cylinder 120 to vary the length of time that the heating elements 16 remain energized.

Figure 9:
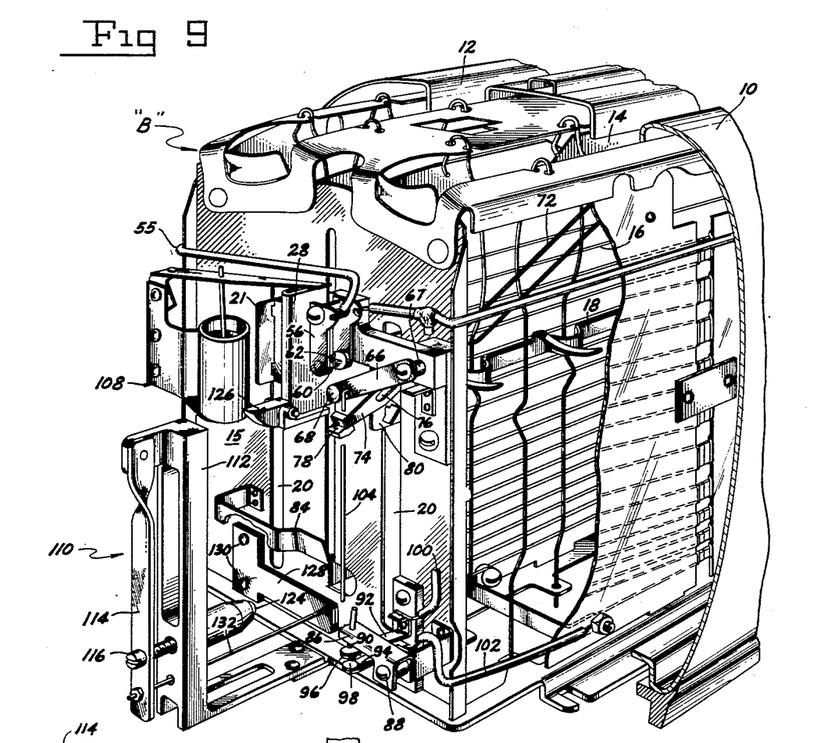
Fig. 9 is a perspective view showing the toaster in its non-toasting position just as in Fig. 1 but illustrating a different embodiment which the invention may assume.
Figure 10:
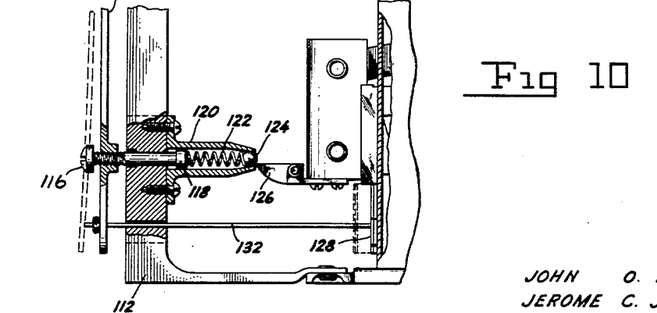
Fig. 10 is a detailed view, partly in section, showing the latching arrangement used in conjunction with the embodiment of Fig. 9.

Inasmuch as the operation of the embodiment "B" pictured in Figs. 9 and 10 is quite similar to that of the earlier described modification "A," a full explanation of the operation is not thought to be necessary. In contrasting the embodiments "A" and "B," it might be emphasized that in embodiment "B" the restraining action is by means of a mechanical latch whereas in embodiment "A" a magnet is utilized. The action of the bimetallic member 40, however, is identical in both embodiments and serves to not only effect lowering and raising of the bread carriage 18 but as a timing means therefor as well.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. A toaster comprising a heating element, a toast carriage movable relative to said heating element into non-toasting and toasting positions, a bimetallic member for moving said carriage between said positions, means for heating said bimetallic member to cause said carriage to move to its toasting position, the cooling of said bimetallic member first serving to time the toasting operation and then moving said carriage to its non-toasting position, and means acting in a direction to oppose movement of said bimetallic member during the timing operation.

2. A toaster comprising a heating element, a toast carriage movable relative to said heating element into non-toasting and toasting positions, a resilient bimetallic member for moving said carriage between said positions, means for heating said bimetallic member to cause said carriage to move to its toasting position, the cooling of said bimetallic member moving said carriage to its non-toasting position, and means for releasably restraining the movement of the bimetallic member during at least a portion of its cooling period thereby to provide a timing action during the toasting operation produced by sufficient cooling of said bimetallic member, said sufficient cooling building up enough force in said bimetallic member to effect its own release.

3. A toaster comprising a heating element, a toast carriage movable by gravity relative to said heating element between an upper non-toasting and a lower toasting position, a lever member pivotally mounted intermediate its ends having one end connected with said carriage and its other end having a notch formed therein, a bimetallic member having one end supportedly engaged in said notch and its other end fixedly disposed for normally retaining said carriage in its upper non-toasting position, and means for heating said bimetallic member to cause deflection thereof with consequent falling of said carriage from said upper non-toasting position to said lower toasting position.

4. A toaster in accordance with claim 3 in which return of said bimetallic member to a sufficiently cooled state provides the force for moving said carriage back to its non-toasting position.

5. A toaster in accordance with claim 4 in which said heating means includes an electrical heating element in heat transfer relationship with said bimetallic element.

6. A toaster comprising a heating element, a toast carriage movable relative to said heating element between non-toasting and toasting positions, a lever member pivotally mounted intermediate its ends having one end connected with said carriage and its other end having a notch formed therein, an elongated bimetallic member having one end engaged in said notch and its other end fixedly disposed with respect to the toaster, means for heating said bimetallic member to cause deflection thereof with consequent movement of said carriage from non-toasting to toasting position, means for releasably holding the carriage in said toasting position, the inherent tendency of the bimetallic member to assume a straighter condition when cool serving to overcome the holding action of said releasable means after a predetermined cooling of said bimetallic member to return said carriage to its non-toasting position whereby said bimetallic member acts as a timer until its predetermined cooling is reached, the carriage then being moved by the bimetallic member to deenergize the heating element as the carriage is initially moved thereby from its toasting position.

7. A toaster comprising a heating element, a toast carriage movable relative to said heating element between an upper non-toasting and a lower toasting position, a thermal motor for permitting gravitational movement of said carriage downwardly from its non-toasting position to its toasting position when energized, a first pair of cooperable contacts in circuit with said thermal motor for energizing same, a first pivotal arm for closing said first contacts, means for initially swinging said first arm to close said first contacts when the carriage is in non-toasting position to energize said thermal motor, a second pair of cooperable contacts in circuit with said heating element for energizing said element to effect a toasting operation, a second pivotal arm for closing said second contacts, actuating means mounted on said carriage for engaging said second arm to effect closing of said second contacts, and a link member having its opposite ends connected to said pivotal arms to cause said first arm to open said first contacts when said actuating means engages said second arm to close said second contacts.

8. A toaster comprising a heating element, a toast carriage movable relative to said heating element between an upper non-toasting and a lower toasting position, a thermal motor for permitting gravitational movement of said carriage downwardly from its non-toasting position to its toasting position when energized, a pair of resiliently mounted spaced contacts in circuit with said thermal motor for energizing same, a first pivotal arm carrying a contact for bridging said spaced contacts, means for initially swinging said first arm to bridge and slightly spread said spaced contacts when the carriage is in non-toasting position to energize said thermal motor, the resilient action of said spaced contacts exerting sufficient pressure to retain said bridging contact therebetween until a subsequent opposite force is applied to said first arm, a second pair of cooperable contacts in circuit with said heating element for energizing said element to effect a toasting operation, a second pivotal arm for closing said second contacts, actuating means mounted on said carriage for engaging said second arm to effect closing of said second contacts, and a link member having its opposite ends connected to said pivotal arms to transmit said opposite force to said first arm when said actuating means engages said second arm to close said second contacts.

9. A toaster comprising a heating element, a toast carriage movable relative to said heating element between an upper non-toasting and a lower toasting position, a thermal motor for moving said carriage downwardly from its non-toasting position to its toasting position when energized, a pivotally and slidably mounted lever on said carriage having one end engageable by a slice of bread, first switch means closable by the other end of said lever when pivoted by said bread slice in the non-toasting position of said carriage, second switch means in circuit with said heating element for energizing said element to effect a toasting operation, said second switch means being closable by said lever when said carriage reaches its toasting position and means interassociated with said first and second switch means to open said first switch means upon closure of said second switch means.

10. A toaster in accordance with claim 9 including a cam in the path of said lever for shifting said lever so that it will not re-close said first switch means when said carriage is returned to its non-toasting position.

11. A toaster in accordance with claim 10 in which said other end of the lever is of sufficient weight to cause said lever to pivotally and slidably shift back to its original position upon removal of the slice of bread after the toasting operation.

12. A toaster comprising a heating element, a toast carriage movable relative to said heating element between an upper non-toasting and a lower toasting position, a thermal motor for moving said carriage downwardly from its non-toasting position to its toasting position when energized, a pivotally and slidably mounted lever on said carriage having a lighter end disposed so as to be engaged by a slice of bread and a heavier end projecting from said carriage, first switch means in circuit with said thermal motor for energizing same, a first pivotal arm frictionally engageable with said first switch means for closing same, said first arm in turn being actuatable by the heavier end of said lever when the slice of bread is placed upon the lighter end thereof, the friction between the arm and switch means being sufficient to retain said arm in engagement until a subsequent opposite force is applied to said arm, second switch means in circuit with said heating element for energizing said element to effect a toasting operation, a second pivotal arm for closing said second switch means, said second arm being disposed for engagement by said lever in the toasting position of said carriage, and a link member having its ends connected to said pivotal arms to transmit said opposite force to said first arm when said lever engages said second arm to close said first switch means.

13. A toaster comprising a heating element, a toast carriage movable relative to said heating element between an upper non-toasting and a lower toasting position, a thermal motor for moving said carriage downwardly from its non-toasting position to its toasting position when energized, a pivotally and slidably mounted lever on said carriage having a lighter end disposed so as to be engaged by a slice of bread and a heavier end projecting from said carriage, a pair of resiliently mounted, spaced contacts in circuit with said thermal motor for energizing same, a first pivotal arm provided with a contact for bridging said spaced contacts, said first arm being disposed for engagement by said lever and the resilient action of said spaced contacts exerting sufficient pressure to retain said bridging contact between said spaced contacts until a subsequent opposite force is applied to said first arm, a second pair of cooperable contacts in circuit with said heating element for energizing said element to effect a toasting operation, a second pivotal arm for closing said second contacts, said second arm being disposed for engagement by said lever in the toasting position of said carriage, a link member having its ends connected to said pivotal arms to transmit said opposite force to said first arm when said lever engages said second arm to close said contacts, a cam in the path of said heavier lever end for shifting said lever so that on the upward travel of said carriage said heavier end will not engage said first arm thereby to preclude rebridging of said first contacts without first removing the toasted bread slice.

14. A toaster comprising a stationary housing structure, a heating element, fixedly disposed within said housing structure, a toast carriage movable relative to said heating element into non-toasting and toasting positions within said housing structure, a bimetallic member engaged with said carriage at one end and said housing structure at its other end, said bimetallic member being capable of deflecting in one direction when heated to effect movement of the carriage from a non-toasting position to its toasting one and upon cooling to deflect in a reverse direction to return the carriage to its non-toasting position, and latch means for retaining said carriage in its toasting position until said bimetallic member has deflected back toward its cool position a preferred amount, said latch means including a spring pressed detent and a cooperable dog element, one of which last-mentioned elements is mounted on said housing structure and the other of which is mounted on said carriage.

15. A toaster comprising a heating element, a toast carriage movable relative to said heating element into non-toasting and toasting positions, a first bimetallic member engaged with said carriage and capable of deflecting in one direction when heated to effect movement of the carriage from a non-toasting position to its toasting one and upon cooling to deflect in a reverse direction to return the carriage to its non-toasting position, a fixedly disposed cage member, a ball projecting from one end of said cage member, a second bimetallic member responsive to ambient temperature within the toaster, a coil spring interposed between said second bimetallic member and said ball to urge said ball into projecting position, heating of said second bimetallic member reducing the spring pressure exerted against said ball, and a dog element on the carriage engageable with said ball.

16. A toaster comprising a heating element, a toast carriage movable relative to said heating element into non-toasting and toasting positions, a bimetallic member engaged with said carriage capable of deflecting in one direction when heated to effect movement of the carriage from a non-toasting position to its toasting one and upon cooling to deflect in a reverse direction to return the carriage to its non-toasting position, an armature mounted on said carriage and movable therewith, and permanent magnet means disposed in the path of the armature for attracting and releasably holding said armature to retain said carriage in its toasting position, sufficient deflection of said bimetallic member toward its cool position serving to cause disengagement of said armature from the magnet means and return of the carriage to its non-toasting position, whereby the time that it takes for said bimetallic member to reach said sufficient deflection state establishes the toasting period.

17. A toaster comprising a stationary housing structure, a heating element fixedly disposed within said housing structure, a toast carriage movable relative to said heating element into non-toasting and toasting positions within said housing structure, a bimetallic member engaged with said carriage at one end and said housing structure at its other end, said bimetallic member being capable of deflecting in one direction when heated to effect movement of the carriage from a non-toasting position to its toasting one and upon cooling to deflect in a reverse direction to return the carriage to its non-toasting position, latch means for retaining said carriage in its toasting position until said bimetallic member has deflected back toward its cool position a preferred amount, said latch means including a spring pressed detent and a cooperable dog element, one of which last-mentioned elements is mounted on said housing structure and the other of which is mounted on said carriage, and thermostatic means acting against said detent element for reducing the spring pressure against said dog element as the ambient temperature within the toaster increases.

References Cited in the file of this patent

UNITED STATES PATENTS

| | | |
|---|---|---|
| 2,149,965 | Ireland | Mar. 7, 1939 |
| 2,194,859 | Malmquist et al. | Mar. 26, 1940 |
| 2,337,098 | Gomersall | Dec. 21, 1943 |
| 2,587,968 | Coons et al. | Mar. 4, 1952 |
| 2,655,860 | Smith | Oct. 30, 1953 |
| 2,667,828 | Koci | Feb. 2, 1954 |